(12) United States Patent
McMillen

(10) Patent No.: US 7,140,681 B2
(45) Date of Patent: Nov. 28, 2006

(54) OCCUPANT CENTERING ERGONOMIC SUPPORT APPARATUS AND METHOD

(75) Inventor: Robert J. McMillen, Tecumseh (CA)

(73) Assignee: L&P Property Management Company, South Gate, CA (US)

( * ) Notice: Subject to any disclaimer, the term of this patent is extended or adjusted under 35 U.S.C. 154(b) by 243 days.

(21) Appl. No.: 10/654,496

(22) Filed: Sep. 3, 2003

(65) Prior Publication Data

US 2005/0046252 A1 Mar. 3, 2005

(51) Int. Cl.
*A47C 3/025* (2006.01)
(52) U.S. Cl. ............................ 297/284.9; 297/284.4; 297/452.34; 297/452.35
(58) Field of Classification Search ............ 297/284.1, 297/284.2, 284.3, 284.4, 362.11, 284.9, 452.29, 297/452.34, 452.35, 452.36
See application file for complete search history.

(56) References Cited

U.S. PATENT DOCUMENTS

| | | | |
|---|---|---|---|
| 4,182,533 A | 1/1980 | Arndt et al. | |
| 4,500,136 A * | 2/1985 | Murphy et al. | 297/284.9 |
| 4,536,030 A * | 8/1985 | Sakurada et al. | 297/284.9 |
| 4,576,410 A * | 3/1986 | Hattori | 297/284.4 |
| 4,636,000 A * | 1/1987 | Nishino | 297/284.9 |
| 4,938,529 A * | 7/1990 | Fourrey | 297/284.9 |
| 5,217,278 A * | 6/1993 | Harrison et al. | 297/284.7 |
| 5,397,164 A | 3/1995 | Schuster et al. | |
| 5,425,569 A * | 6/1995 | Hayes | 297/452.35 |
| 5,638,722 A | 6/1997 | Klinger | |
| 5,704,687 A | 1/1998 | Klinger | |
| 5,857,743 A | 1/1999 | Ligon et al. | |
| 5,913,569 A | 6/1999 | Klingler | |
| 5,954,399 A * | 9/1999 | Hong | 297/284.4 |
| 6,053,064 A | 4/2000 | Gowing et al. | |
| 6,053,864 A | 4/2000 | Clawson | |
| 6,068,336 A * | 5/2000 | Schonauer | 297/284.9 |
| 6,338,530 B1 * | 1/2002 | Gowing | 297/284.4 |
| 6,499,803 B1 * | 12/2002 | Nakane et al. | 297/284.4 |
| 6,536,840 B1 * | 3/2003 | Schuster et al. | 297/284.1 |
| 2004/0140700 A1 | 7/2004 | McMillen et al. | |

FOREIGN PATENT DOCUMENTS

| | | |
|---|---|---|
| DE | 20107424 U1 | 11/2001 |
| DE | 10135122 C1 | 12/2002 |
| EP | 0582821 A | 2/1999 |
| GB | 1512028 A | 5/1978 |
| WO | WO 99/41103 | 8/1999 |

OTHER PUBLICATIONS

International Search Report.

* cited by examiner

*Primary Examiner*—Peter M. Cuomo
*Assistant Examiner*—Erika Garrett
(74) *Attorney, Agent, or Firm*—Husch & Eppenberger, LLC; Grant D. Kang

(57) ABSTRACT

An ergonomic support for an automobile seat includes a pivoting bolster on a mounting rod. Behind the bolster is a slide rod. A lever is disposed between the bolster and the slide rod. The lever is pivotally attached to a medial position of the bolster and the lever is slidingly engaged with the slide rod. A traction cable has a sleeve mounted to a bracket on the mounting rod and a wire attached to the lever. Traction on the traction cable moves the lever, which causes the bolster to extend.

20 Claims, 10 Drawing Sheets

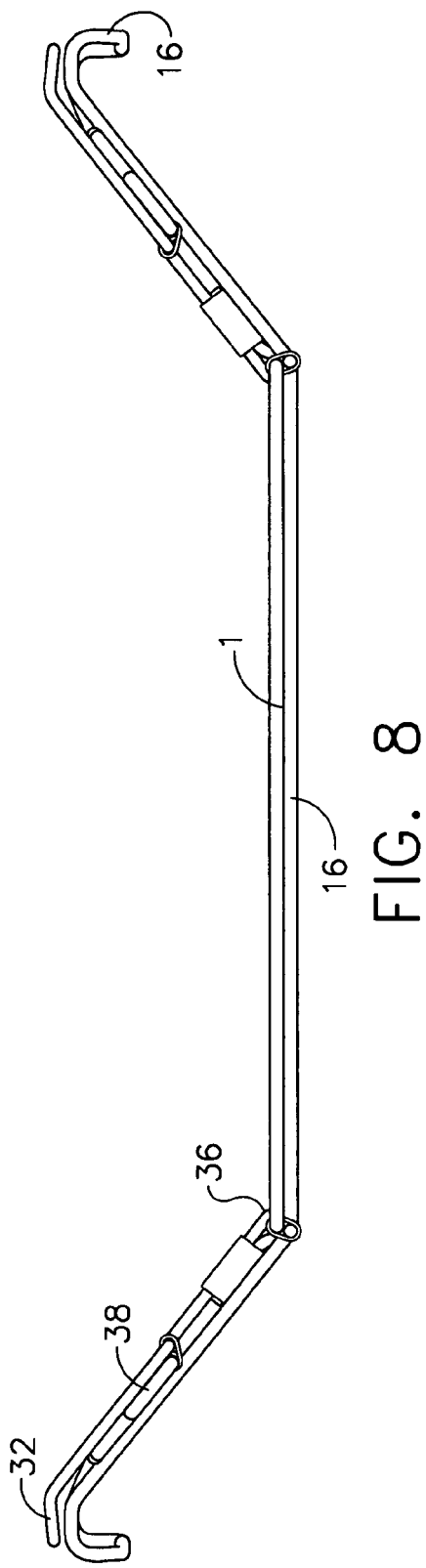

OCCUPANT CENTERING ERGONOMIC SUPPORT APPARATUS AND METHOD

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

This invention is in the field of ergonomic supports for automobile seats.

2. Related Art

There is a continuing need in the field of ergonomic supports for seats in motor vehicles and other transportation vehicles for increasing the economy and efficiency of the components used to provide ergonomic support, while at the same time increasing comfort and safety for the passenger. It is desirable to reduce the size of the package of components necessary to provide ergonomic support, both in terms of overall volume and front to back depth of the ergonomic support in a retracted position.

Safety advances for transportation vehicle seats have recently developed to include airbags and other design features directed towards enhancing the safety and reducing the likelihood of injury to a passenger during a crash. Many of these devices, such as airbags, rely to a certain extent on a predicable position of a passenger during a crash. Most often, this is centered in the seat and upright. Accordingly, there is a need in the field for a device that will assist in maintaining a passenger comfortably in a predicted, centered position in a seat.

Passenger comfort not only encompasses sitting in the seat, but entering and leaving the car or other transportation vehicle. It is advantageous during ingress and egress for the ergonomic supports to be retracted and as thin as possible.

SUMMARY OF THE INVENTION

It is in light of the above described needs and advantages that the present invention was developed. The present invention is an ergonomic support for a seat for an automobile or other transportation vehicle. In one embodiment, the ergonomic support of the present invention is a bolster, such as a lateral bolster. The lateral bolster assembly includes a pivoting bolster, a slide rod and a lever between them. The bolster is pivotally mounted on a mounting rod. The lever is pivotally mounted on the bolster. The slide rod is attached to the mounting rod in a manner that is substantially fixed although it may provide for some flexion. The lever disposed between the bolster and the slide rod is pivotally attached to a portion of the bolster and slidingly engaged with the slide rod.

In one embodiment of the present invention, mounting rods are vertical and adaptable for mounting on a seat frame. The side rods are horizontally mounted, and may also engage a seat frame.

Movement of the ergonomic support from a retracted position to an extended position through a selectable range of intermediate positions is achieved with a traction cable, sometimes called a Bowden cable. The Bowden cable has a sheath with a wire coaxially disposed within the sheath and sliding within it. At one end of the Bowden cable is an actuator. The actuator may be a manual device such as a hand wheel or lever, or it may be a power device such as an electric motor and gear assembly. At the other end of the traction cable, the sleeve is fixedly mounted to a bracket or other attachment and the wire, proceeding from the end opening of the sleeve, is attached to a portion of the lever. In one embodiment, a portion of the lever to which the wire is attached is substantially opposite that portion of the lever that is pivotally attached to the bolster.

In operation, the actuator is used to put traction on the traction cable when the ergonomic support is in a retracted position. The traction causes the wire to pull the lever in such a fashion that the portion of the lever disposed to slide along the horizontal side rod does side along it. This traction thereby causes the bolster to extend, via the lever's pivoting attachment with the bolster. The lever's pivoting attachment to the bolster is at a substantially medial position along the horizontal length of the bolster.

The ergonomic support of the present invention may be combined in pairs. It may be disposed upon a seat bottom for thigh support. It may be disposed in combination with a lumbar support of any known variety.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIG. 8 is a bottom view of the ergonomic support of the present invention in a retracted position.

FIG. 9 is a bottom view of the ergonomic support of the present invention in an extended position.

DETAILED DESCRIPTION OF THE PREFERRED EMBODIMENTS

Figure 1:
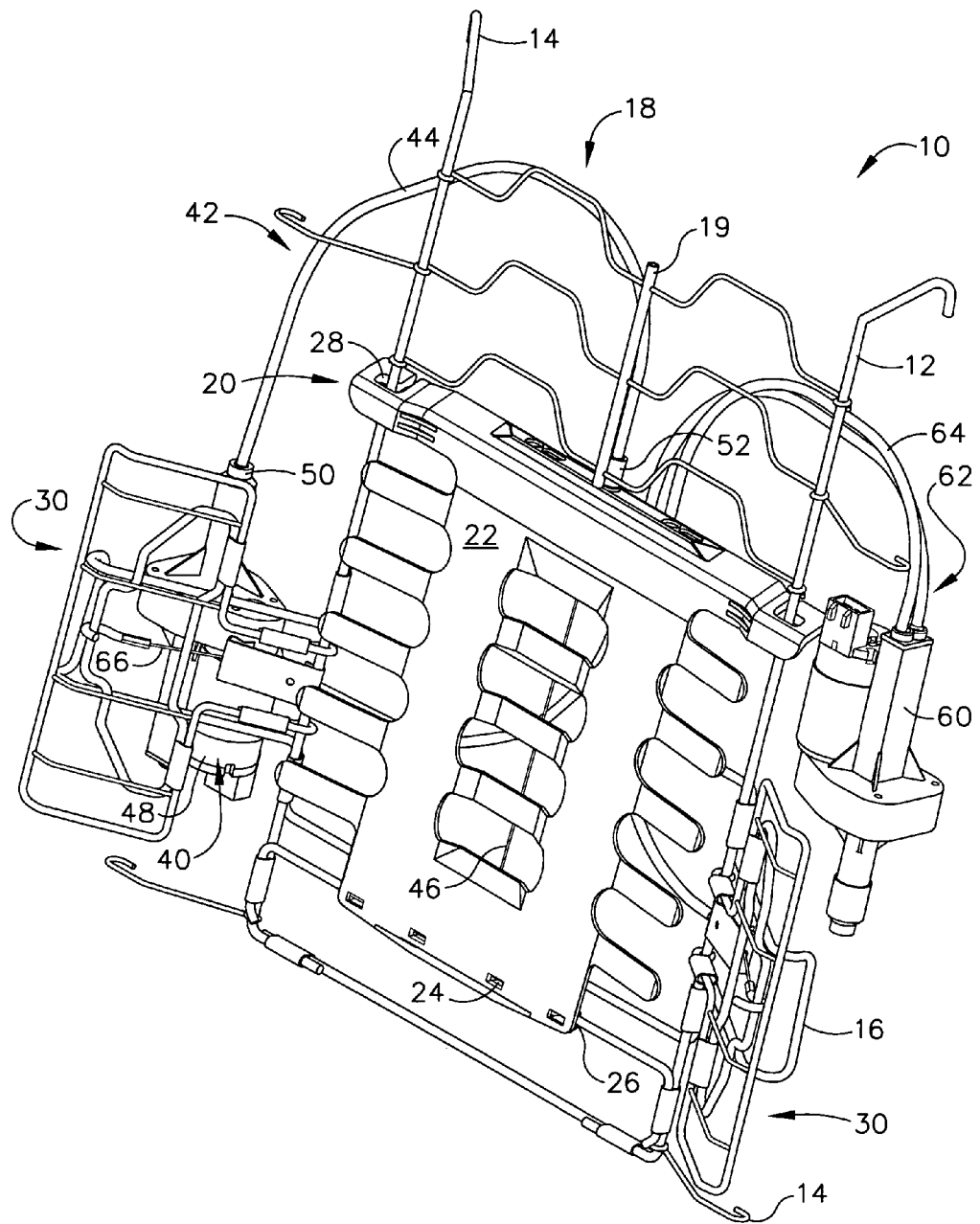
FIG. 1 is a front perspective view of the ergonomic support of the present invention in a retracted position.
Figure 2:
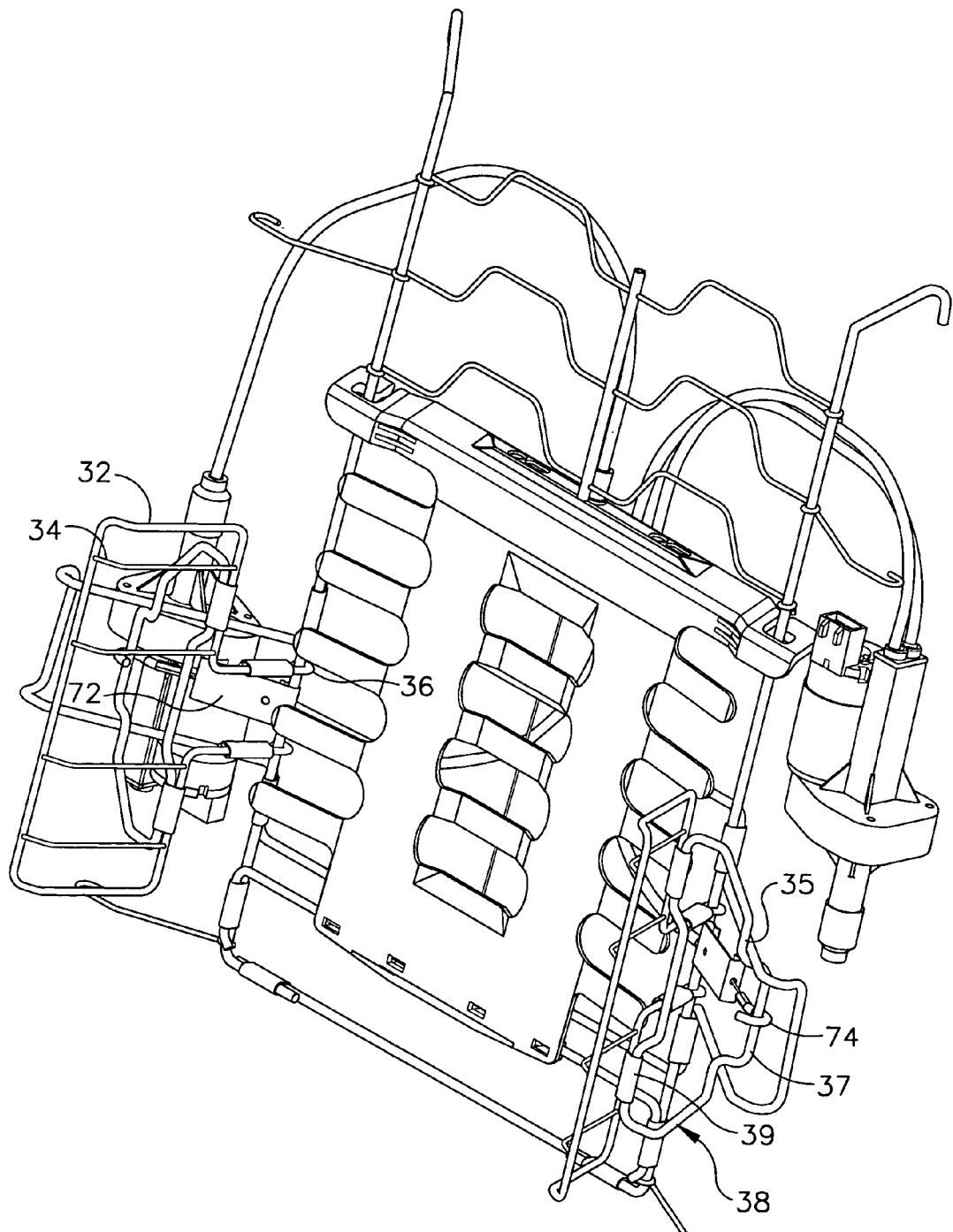
FIG. 2 is front perspective view of the ergonomic support of the present invention in an extended position.
Figure 3:
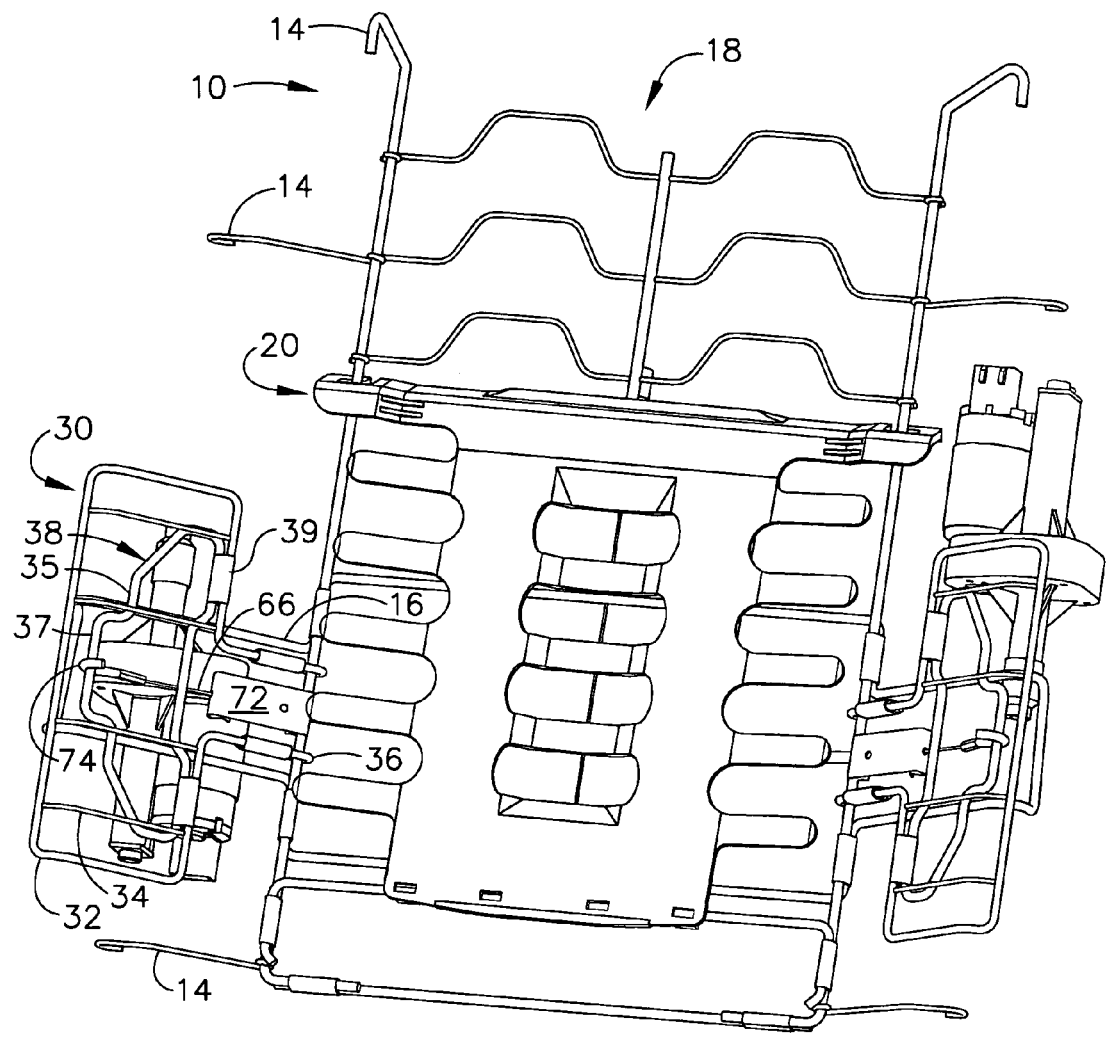
FIG. 3 is another front perspective view of the ergonomic support of the present invention.
Figure 4:
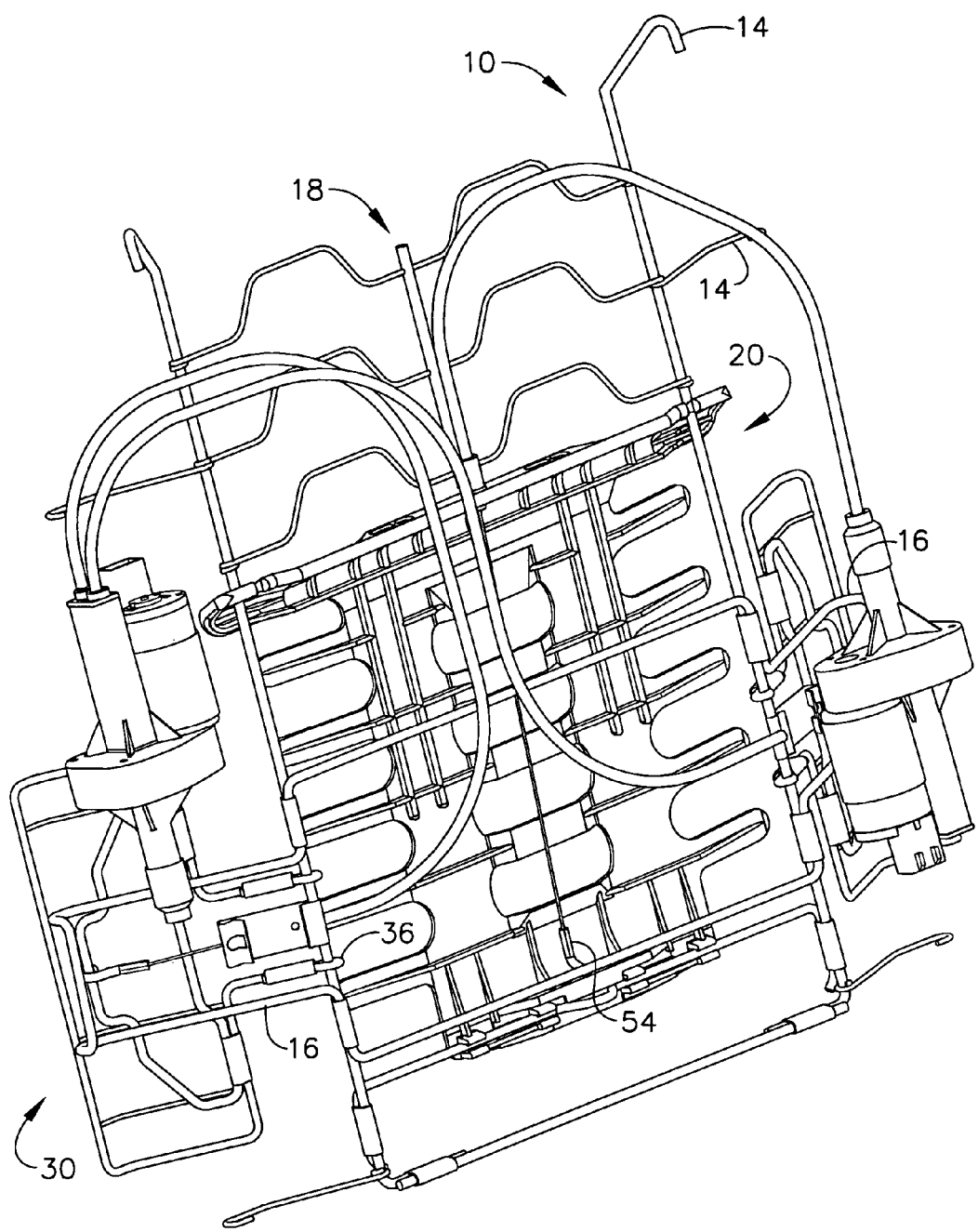
FIG. 4 is a rear perspective view of the ergonomic support of the present invention.

Referring now to the drawings in which like reference numbers indicate like elements. FIGS. 1, 2, 3 and 4 depict a first embodiment of the occupant centering ergonomic support assembly of the present invention. The assembly is comprised generally of a guide rod assembly 10 used to mount the ergonomic support assembly in a seat frame, a lumbar support assembly 20 which may be selectively positioned for lumbar support; and lateral bolsters 30 used for further support and for centering the seat occupant.

Guide rod assembly 10 is an assembly of components including guide rods 12, mounting hooks 14 and horizontal slide rods 16. Mounting hooks 14, which may be a bent portion of the guide rails 12, or which may be additional wires assembled with guide rails 12, are used to hook the ergonomic support assembly into a mount on the seat frame. Mounting hooks 14 are adaptable to various seat frames. Horizontal slide rods 16 serve a dual function. They are bent at their lateral terminus so that they may also be used to mount the ergonomic support assembly on the seat frame. These hooks at the end of horizontal slide rod 16 also serve to secure them in a fixed position. Those with skill in the art will note that horizontal slide rods 16 include an angle or dihedral relative to the plane of the center portion of the ergonomic support, defined by the guide rods 12. This angle may be changed or made flat to accommodate various seat back frames into which the ergonomic support assembly may be mounted. Generally, the guide rods 12 and horizontal slide rods 16 once mounted, remain in a fixed position and do not move, other than a slight flexion for load bearing. The horizontal slide rods 16 will act as a fixed slide against which a lever may push in order to extend lateral bolsters, as more fully described below.

The guide rod mounting assembly 10, in the depicted embodiment, is supplemented with further back support for a seat occupant in the form of a wire array 18. The wire array 18 in the depicted embodiment is composed of horizontal wires assembled between guide rails 12. The horizontal wires may have convolutions. The horizontal wire array 18 may also have a stabilizing vertical connection member 19.

The lumbar support assembly 20 is comprised of an arching pressure surface 22. The surface may be assembled of multiple components, but may also be, as depicted, a single piece of molded plastic or stamped metal. It is mounted on guide rails 12 such that it may move relative to them for creating an arch which will support a seat occupant's lumbar spine. This relative motion may be achieved in a variety of ways, all within the scope of the present invention. In the depicted embodiment, arching pressure surface 22 is mounted with a snap fit 24 at a lower horizontal mounting rod 26 such that it may pivot there. Top mounts are slides 28 which allow the upper portion of the arching pressure surface 22 to slide up and down on the guide rails 12. The combination of pivoting motion around pivoting mounts 26 and sliding motion of slide mounts 28 along guide rails 12 allows the arching pressure surface to be flexed into an arch as its upper end and lower end slide and/or pivot on the plane defined by the guide rails 12.

Arching pressure surface actuator 40 is connected to the arching pressure surface by a Bowden traction cable 42. Bowden cable 42 is comprised of a cable sleeve 44 with a wire 46 disposed to slide through the sleeve 44. The power actuator 40, is disposed to apply traction to the Bowden cable wire 46 in order to slide it axially through the Bowden cable sleeve 44. In the depicted embodiment, the actuator 40 is comprised of an electric motor 48 and a gear housing 50 containing the requisite components for applying the traction. Any of a variety of known power actuator gearing systems may be assembled with the ergonomic support of the present invention without departing from the scope of the present invention. Such actuation systems are disclosed in U.S. Pat. Nos. 5,397,164, 5,638,722, 5,704,687 and 6,053,064, which are incorporated by reference herein.

The Bowden cable sleeve 44 is mounted at one end of the arching pressure surface 22. This mount 52 is at an opposite end of the arching pressure surface 22 from the Bowden cable wire mount 54 (FIG. 4) which is attached at the opposite end of the arching pressure service 22. Dynamic tension exerted by the traction applied by the actuator 40 pulls sleeve mount 52 and wire mount 54 towards one another, providing the pressure and traction necessary to force arching pressure surface 22 into an arched position and further necessary for maintaining that position for support of the seat occupant's weight.

Lateral Bolsters

The lateral bolsters assemblies 30 move from a relatively flat position to an extended position to provide further ergonomic support for a seat occupant, and further to bias and support a seat occupant in a centered position for comfort and safety.

The actual lateral bolster pressure device is comprised first of bolster paddle 32. In the depicted embodiment this is a peripheral wire 32 supplemented by intermediate wires 34. In alternative embodiments, the bolster paddle 32 may also be a molded plastic component with a pressure surface. The bolster peripheral wire is pivotally mounted to guide rails 12 at pivot mount 36. The pivot mount allows the bolster peripheral rod 32 to pivot around the vertical axis of guide rail 12 so that it may move between a relatively flat position abutting horizontal slide rod 16 to a more extended position for support. Disposed between the lateral bolster peripheral rod 32 and the horizontal slide rod 16 is lever 38. Lever 38 is pivotally mounted to an aspect of peripheral lateral bolster rod 32 at pivot mount 39. The pivot mount 39 allows lever 38 to move relative to the lateral bolster peripheral rod 32, and also to pivot around the vertical axis defined by the aspect of lateral bolster peripheral wire 32 at which the lever mounts. The pivot for lever 38 may be anywhere on the bolster, provided that rotation of the lever 38 around the pivot 39 extends the bolster. In the depicted embodiment, pivot 39 is at a horizontally, intermediate position on rod 32. (See also, FIGS. 8 and 9)

Lever 38 is further configured to interact with horizontal slide rods 16 in a sliding fashion when under tension. The depicted embodiment shows level 38 as a configured rod. The configured rod includes an extension 37 dimensioned to fit between the upper and lower aspects of horizontal guide rod 16. Lever 38 also has a sliding pressure surface 35 that is disposed to interact with horizontal slide rod 16 to a sliding fashion. When tension is applied to lever 38, it will rotate around pivot points 39 and slide along horizontal slide rod 16 at pressure surface 35. Because the horizontal slide rods 16 are substantially in a fixed position, they will remain stable as pressure is exerted against them. Accordingly, the opposite end of lever 38, at pivot points 39, will be biased outwards. Through its pivoting attachment 39 to the lateral bolster perimeter rod 32, the lever 38 will push lateral bolster perimeter rod 32 outwards as extension 37 of lever 38 has increasing pressure applied against it.

Pressure is applied against the lever 38 with another traction cable. A second traction cable wire 66 is mounted to extension 37 of the lever 38, with a hook in the depicted embodiment. The actuator assembly 60 actuates the lateral bolsters. It is comprised of two traction cables 62 which are each in turn comprised of a sleeve and wire. There are two traction cables 62 for actuating two lateral bolsters 30. As before, actuator 60 can be any of a known variety of actuators. The depicted embodiment includes an electric motor and gearing within a housing.

The Bowden cable sleeve 64 is fixed to mounting tab 72. Mounting tab 72 may pivot or be fixedly attached to guide rail 12. In either case, it provides a fixed point of resistance against which traction may be applied through the end of Bowden cable sleeve 64.

Referring now to FIGS. 1, 2, 8 and 9, in operation as traction is applied to draw Bowden cable wire 66 into the Bowden cable sleeve 64, wire mount 74 applies inward traction on lever 38 at extension 37. This draws lever portion 37 inwards, that is, toward a vertical mid-line of the seat and ergonomic support assembly. Pressure surfaces 35 of lever 38 correspondingly slide along horizontal slide bar 16 applying outwards, extending pressure to the lateral bolster perimeter wire 32 at pivot point 39. The dimension of extension 37 relative to the other dimensions of lever 38 may be varied to vary the degree of leverage, or size of any components, as needed.

Figure 5:
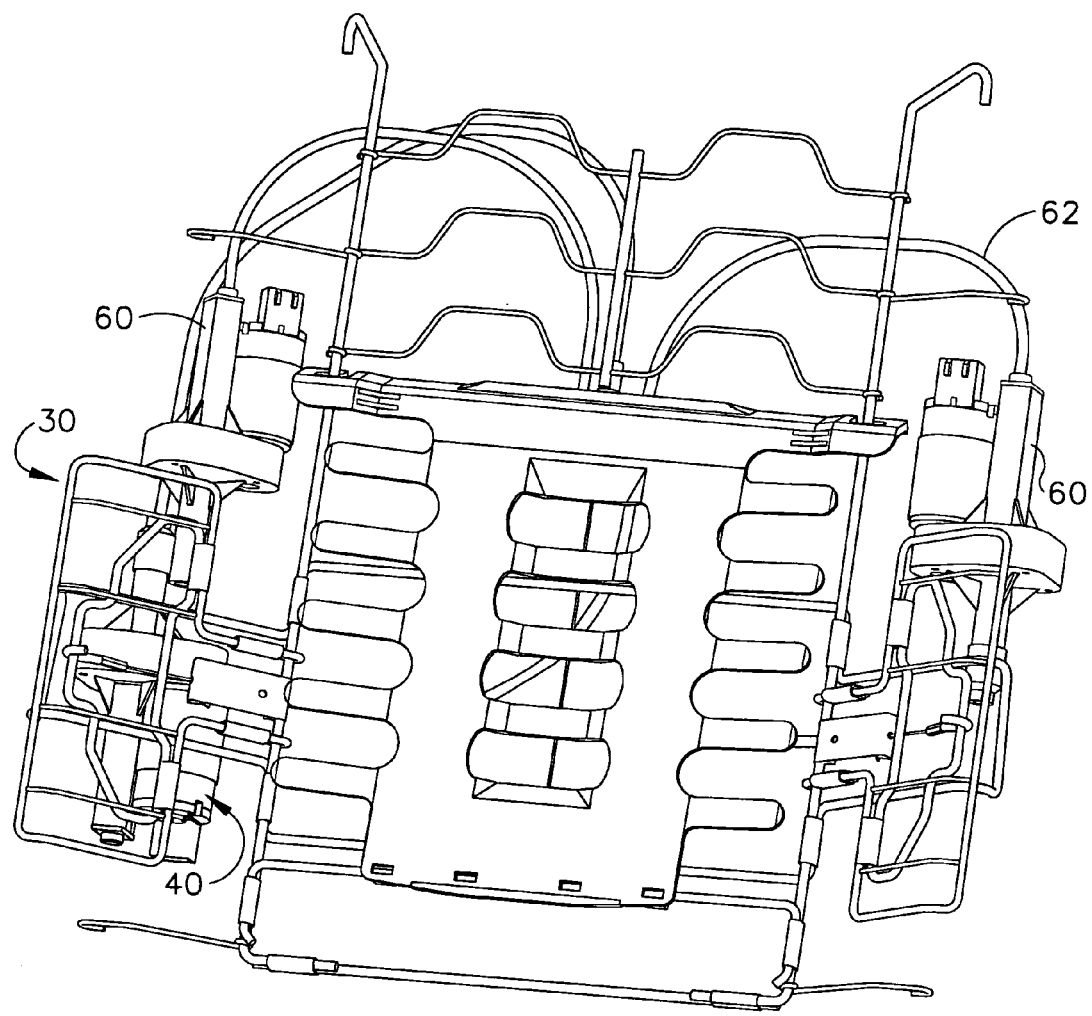
FIG. 5 is a front perspective view of an alternate embodiment of the present invention.

FIG. 5 depicts an alternative embodiment of the present invention. The mechanical aspects, linkages, assembly, mounting and operation of the lumbar support 20 and lateral bolsters 30 remains substantially equivalent to the previously depicted embodiment. Lumbar support actuator 40 is also substantially equivalent to the previously described embodiment. In the embodiment depicted in FIG. 5, however, there are two separate actuators 60 for actuating the lateral bolsters 30. That is, each of the lateral traction cables 62 is attached to a separate actuator, as opposed to both traction cables 62 being operated by a single actuator 60 in the previous embodiment.

Figure 6:
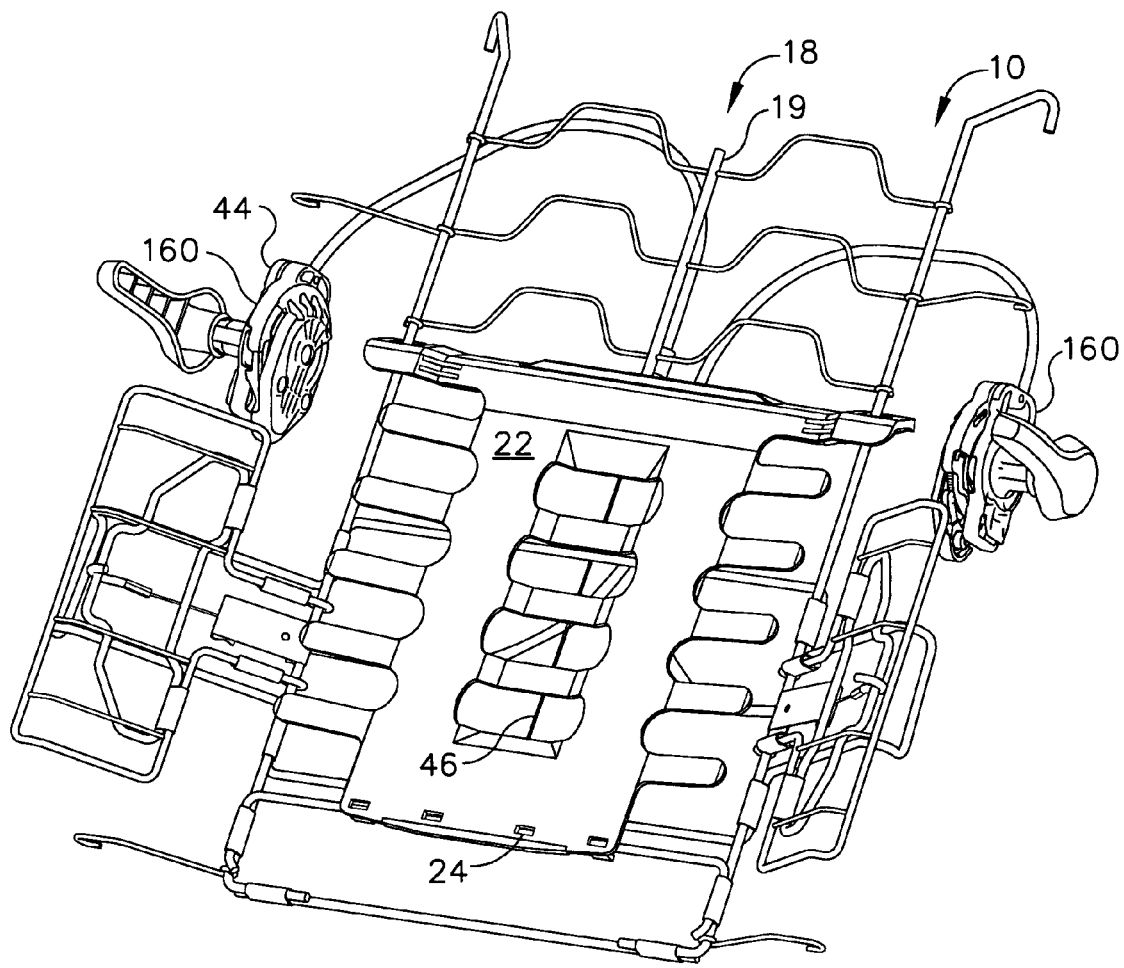
FIG. 6 is a front perspective view of another alternative embodiment of the present invention.
Figure 7:
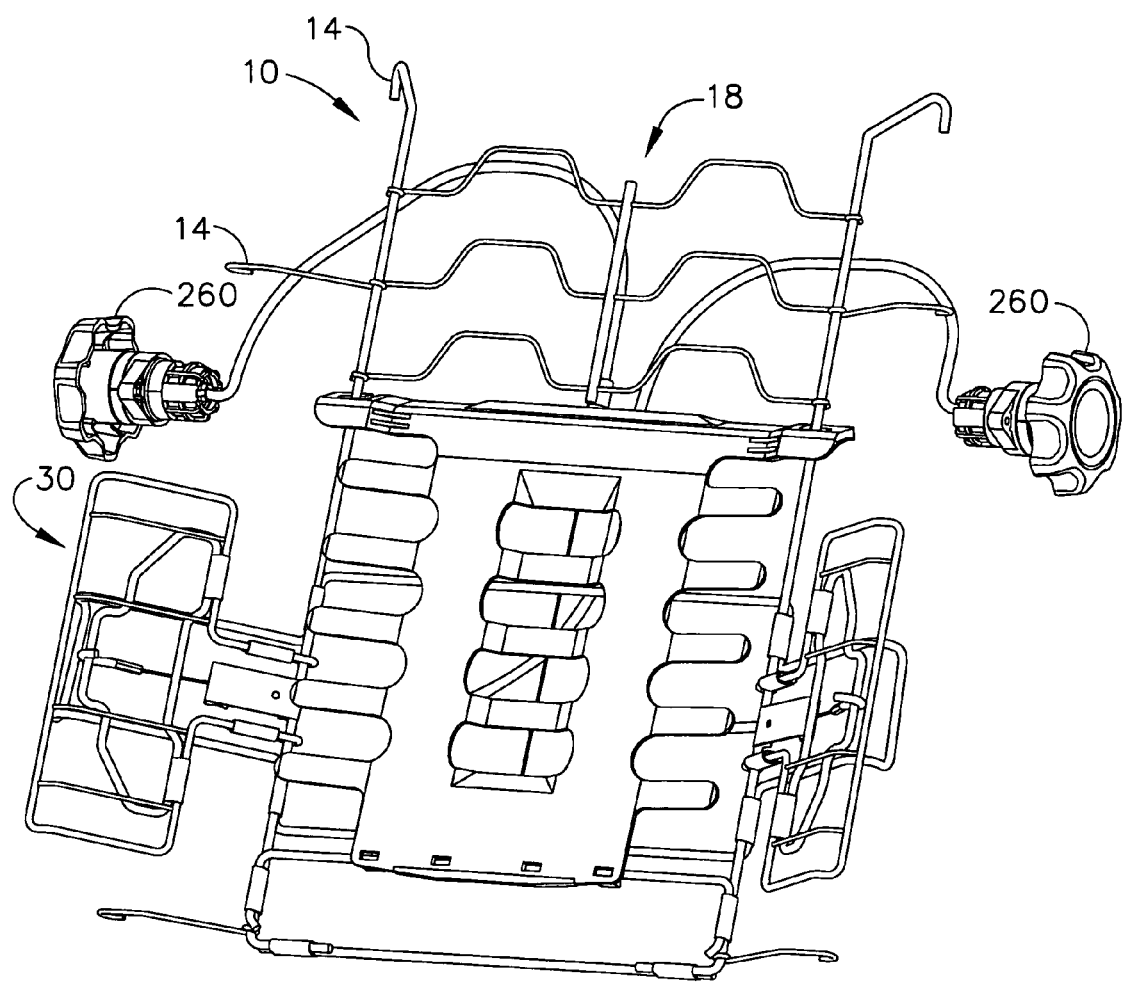
FIG. 7 another front perspective view of another embodiment of the present invention.

FIGS. 6 and 7 depict a manually actuated embodiment of the present invention. Again, the components, assembly linkages, mounting and operation of the lumbar support and lateral bolsters are substantially equivalent to the previously described embodiments. Again, the traction cables actuate the lumbar support and lateral bolsters. In the embodiment depicted in FIGS. 6 and 7, however, manual actuators 160,260 (lever and hand wheel, respectively) are used to apply traction. The manual actuators may be mounted in any appropriate location, typically on the side of a seat-backed frame, although a seat bottom frame or, as in the case of a fold-down third row seat in the back of a sport utility vehicle, they may be mounted remote from the seat itself as on the floor or in a recess.

The lateral bolsters and lumbar support may be actuated by a self actuating device as well, such as that described in U.S. patent application Ser. No. 10/349,525, which is incorporate by reference herein.

Figure 10:
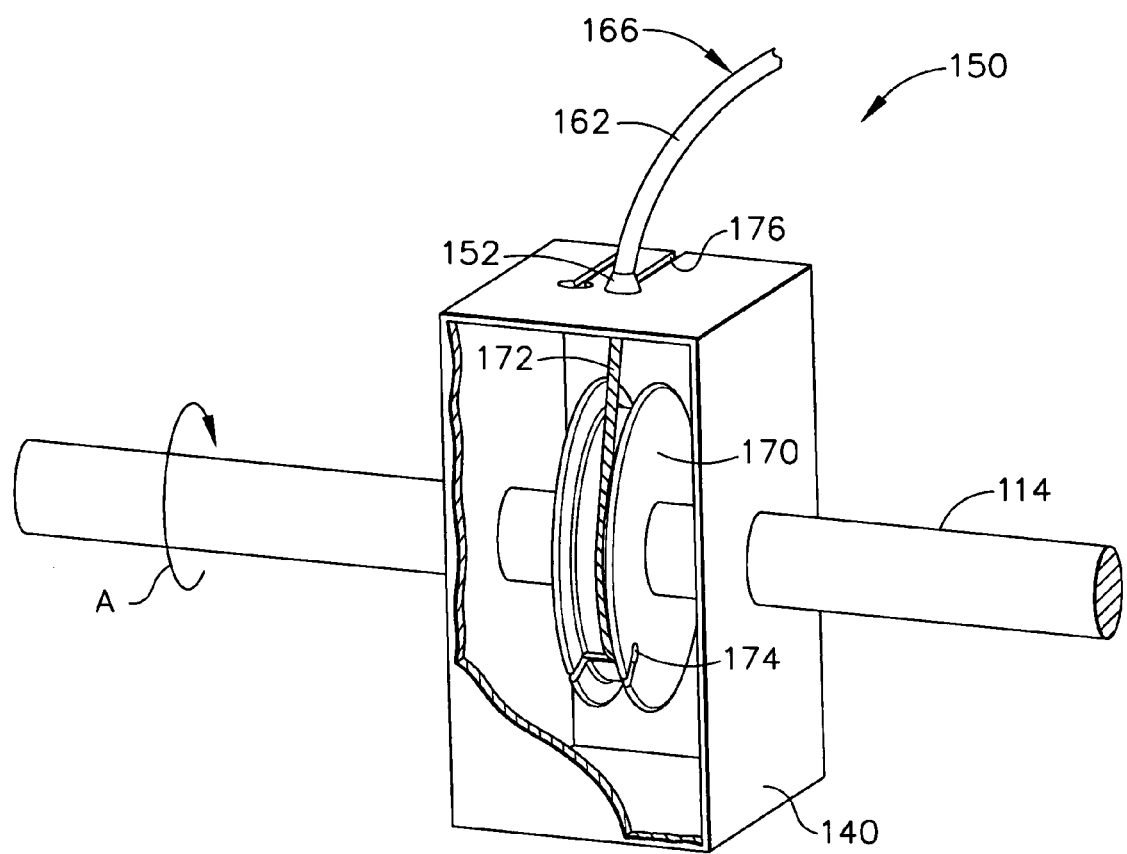
FIG. 10 is a self-presenting actuator to be mounted on a torsion rod forming a hinge between a seat back and a seat bottom.

Actuation may also be had be means of a self-presenting linkage in a fold down seat. In figure 10 a traction module is depicted in its linkage with a hinge between a seat bottom and a seat back. The housing 140 moves relative to the torsion bar or hinge pin 114. The pulley 170 within the housing is fixedly attached to the torsion bar or hinge pin 114 so that the pulley 170 rotates with it. A Bowden cable 166 has a sleeve 162 that is mounted 152 at its end to housing 140 in a keyhole slot 176 wide enough to allow passage therethrough of the Bowden cable wire 172, but not the sleeve 162. The Bowden cable wire 172 is fixed to the pulley at keyhole 174. Accordingly, rotation of housing 140 relative to torsion rod 114 will cause movement of the Bowden cable wire 172 relative to the Bowden cable sleeve 162, thereby applying or releasing traction. Traction is applied in the direction indicated by arrow A. The housing is mounted such that it is fixed to one of the seat back or seat bottom and the torsion rod 114 is mounted so that it is fixed relative to the other of the seat back or seat bottom. Thereby, folding the seat up will move the housing and torsion bar relative to one another, exerting traction. The housing and torsion bar are mounted such that folding the seat up will extend the bolster.

Figure 11:
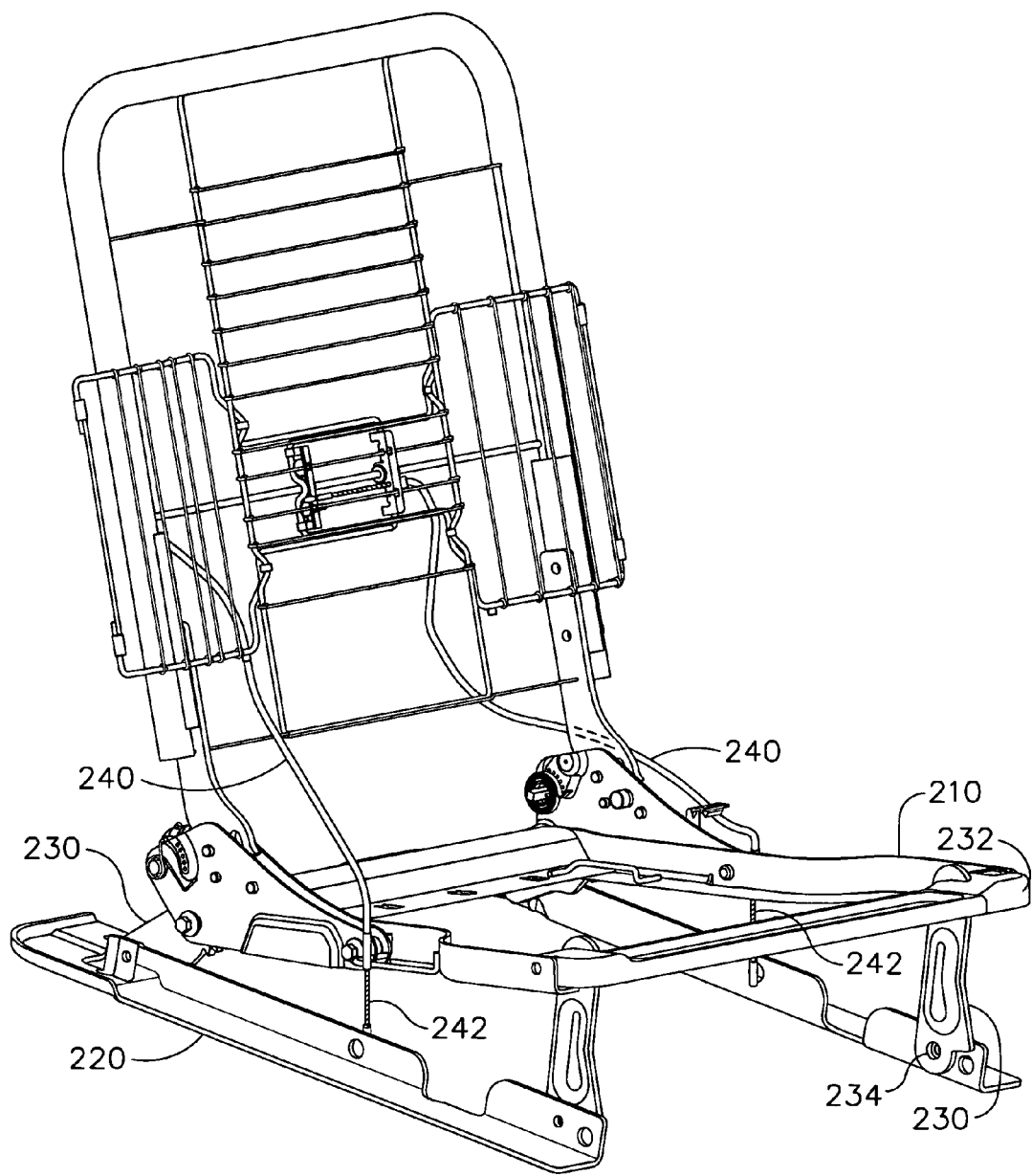
FIG. 11 is a fold down seat depicted a seat bottom frame and a seat bottom base that move relative to one another.

In FIG. 11, a seat is depicted wherein the bottom of the seat is comprised of a seat bottom frame 210 over a seat bottom base 220. The frame and base are connected at each of their corners with four (4) pivoting legs 203, with each leg pivotally mounted to a corner of the frame at the top of the leg 232, and to a corner of the base at the bottom of the leg 234. The Bowden cable sleeve is attached to the seat bottom frame, and the Bowden cable wire 242 is attached to the seat bottom base. Thereby, when a retractable seat, as in the rear of a sport utility vehicle, is raised, and the seat bottom frame is raised relative to the seat bottom base, traction will be exerted on the traction cable. In both of the FIGS. 10 and 11, these self-presenting actuation linkages apply traction to the traction cable for actuating the ergonomic support, which in turn moves the ergonomic support in the manner described above.

In view of the foregoing it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An ergonomic support for a transportation vehicle seat comprising:
    a guide rod adapted to mount on a seat frame;
    a bolster pivotally attached to said guide rod, said bolster having a retracted position and an extended position;
    a slide rod attached to said guide rod;
    a lever pivotally attached to said bolster and disposed to slidingly engage said slide rod such that movement of said lever relative to said slide rod and to said bolster mediates movement of said bolster between said retracted position and said extended position.

2. The ergonomic support of claim 1 further comprising:
    a traction cable said traction cable having a sleeve and having a wire disposed to slide axially within said sleeve, said sleeve and said wire each having a first end and a second end;
    said first ends of said sleeve and said wire being operatively engaged with an actuator for applying traction to said traction cable; and
    said second end of said wire being attached to said lever such that traction applied to said traction cable by said actuator moves said lever in order to extend said bolster.

3. The ergonomic support of claim 2 wherein said actuator is a power actuator.

4. The ergonomic support of claim 2 wherein said actuator is a manual actuator.

5. The ergonomic support of claim 2 wherein transportation vehicle seat is a folding seat and said actuator is a self-presenting linkage within said folding seat.

6. The ergonomic support of claim 5 wherein said self-presenting linkage is mounted to a seat bottom frame over a seat bottom base.

7. The ergonomic support of claim 5 wherein said self-presenting linkage is a traction module having a housing and a pulley.

8. The ergonomic support of claim 2 wherein said second end of said sleeve is mounted to said guide rod.

9. The ergonomic support of claim 1 wherein said bolster is mounted as a thigh support.

10. The ergonomic support of claim 1 wherein said bolster, said lever and said slide rod are configured metal rods.

11. The ergonomic support of claim 1 wherein said bolster is a lateral bolster on a seat back.

12. The ergonomic support of claim 1 wherein said bolster is a lateral bolster on a seat back, in combination with a second lateral support on an opposing side of said seat back.

13. The ergonomic support of claim 12 wherein said lateral supports are combined with a lumbar support.

14. The ergonomic support of claim 13 wherein said lumbar support is an arching pressure surface.

15. A method of assembling a bolster for an ergonomic support comprising;
   pivotally attaching a bolster to a guide rod, said guide rod being adaptable for mounting in a seat frame;
   fixedly attaching a slide rod to said guide rod;
   disposing a lever between said bolster and said slide rod such that said lever is pivotably engaged with said bolster and slidingly engaged with said slide rod; and
   operatively engaging a traction cable with said lever such that traction on said cable causes movement of said lever that extends said bolster.

16. An ergonomic support for a vehicle seat, the ergonomic support comprising:
   a guide rod assembly, said guide rod assembly having at least one slide rod;
   at least one bolster pivotally attached to said guide rod assembly;
   at least one lever pivotally attached to said at least one bolster and disposed to slidingly engage said at least one slide rod;
   at least one traction cable having a sleeve and having a wire disposed to slide axially within said sleeve, said sleeve and said wire each having a first end and a second end, said first ends of said sleeve and said wire being attached to said at least one lever; and
   at least one actuator attached to said second ends of said sleeve and said wire, wherein engagement of said at least one actuator applies a tractive force to said wire such that said wire moves said at least one lever to pivot said at least one bolster.

17. The ergonomic support of claim 16 wherein said at least one actuator is a power actuator.

18. The ergonomic support of claim 16 wherein said at least one actuator is a manual actuator.

19. The ergonomic support of claim 16 wherein said vehicle seat is a folding seat and said at least one actuator is a self-presenting linkage within said folding seat.

20. The ergonomic support of claim 16 further comprising a lumbar support operatively connected to said guide rod assembly.

* * * * *